United States Patent [19]

Anderman

[11] Patent Number: 4,791,037

[45] Date of Patent: Dec. 13, 1988

[54] CARBON ELECTRODE

[75] Inventor: Menahem Anderman, Boyds, Md.

[73] Assignee: W. R. Grace & Co.-Conn., New York, N.Y.

[21] Appl. No.: 896,699

[22] Filed: Aug. 15, 1986

[51] Int. Cl.$^4$ .............................................. H01M 6/14
[52] U.S. Cl. ................... 429/196; 429/209; 429/217
[58] Field of Search ............... 429/196, 209, 217, 218

[56] References Cited

U.S. PATENT DOCUMENTS

| | | | |
|---|---|---|---|
| 3,060,254 | 8/1959 | Urry | 429/217 |
| 3,099,586 | 9/1960 | Duddy | 429/218 |
| 3,184,339 | 4/1962 | Ellis | 264/104 |
| 3,351,495 | 11/1967 | Larsen et al. | 429/252 |
| 3,898,099 | 8/1975 | Baker et al. | 136/75 |
| 4,091,176 | 5/1978 | Alfenaar | 429/40 |
| 4,124,747 | 11/1978 | Murer et al. | 429/210 |
| 4,169,816 | 10/1979 | Tsien | 252/511 |
| 4,223,080 | 9/1980 | Auborn | 429/194 |
| 4,322,317 | 3/1982 | Rao et al. | 429/194 |
| 4,550,064 | 10/1985 | Yen et al. | 429/94 |
| 4,560,632 | 12/1985 | Alberto | 429/196 |
| 4,562,113 | 12/1985 | Yonahara et al. | 429/210 |

OTHER PUBLICATIONS

NASA Technical Brief, vol. 9, No. 2, Item 103 (Summer 1985).
Electrochemica Acta vol. 29, No. 11, pp. 1589–1596, (1984).
J. Electrochem Soc. pp. 656–660 (May 1974).
J. Electrochem. Soc. pp. 1107–1109 (May 1983).
U.S. application Ser. No. 749,597 filed Jun. 27, 1985 entitled: Cathode Including a Non Fluorinated Linear Chain Polymer as the Binder, Method of Making the Cathode, and Lithium Electrochemical Cell Containing the Cathode.

*Primary Examiner*—John F. Niebling
*Assistant Examiner*—Steven P. Marquis
*Attorney, Agent, or Firm*—Howard J. Troffkin

[57] ABSTRACT

An improved carbon cathode and its use in a Li/SO$_2$ battery wherein the cathode is formed from a microporous sheet having a substantially uniform mixture of from 7 to 22 volume percent of an ultra-high molecular weight polyethylene, from 78 to 93 volume percent of a conductive carbon black and from 0 to 2 volume percent of a plasticizer for the polyethylene. The microporous sheet has a void volume of at least 75 percent and exhibits electrical conductivity of at least 0.05 ohm$^{-1}$ cm$^{-1}$.

26 Claims, No Drawings

CARBON ELECTRODE

BACKGROUND OF THE INVENTION

The emergence of primary lithium-sulfur dioxide batteries represents a significant advance in battery technology due to their outstanding performance and also because they represent the first successful use, in a nonreserve, primary cell, of a strong oxidizing agent in a stable, intimate contact with a strong reducing agent. The Li/SO$_2$ system is now an accepted member of the battery family with a growing range of applications. Although applications of greatest interest involve primary Li/SO$_2$ cells, the development of both reserve type and rechargeable cells has also received attention.

The usefulness of the Li/SO$_2$ system stems primarily from its outstanding performance. It has about twice the energy density of conventional alkaline systems, a very high rate capacity and a low temperature performance which is better than that of any other primary battery. In addition, its high temperature shelf-life is excellent and the battery has been shown to have good capacity retention even after 5 years of storage under ambient conditions.

The battery comprises an anode, a cathodic component and an electrolyte. The anode is formed from lithium metal or its alloys with or without a support which, when present, may be in the form of a nickel coated screen or the like. When the bare lithium is initially exposed to the electrolyte mixture containing SO$_2$, it reacts spontaneously to form an insoluble film on its surface. The morphology of the film permits lithium ion transfer and inhibits direct chemical reaction without further separation of the Li and SO$_2$. The electrolytic component generally comprises a lithium salt, such as a lithium halide, carbonate or hexafluoroarsenate in organic solvents which also contains the SO$_2$ liquid. Typical organic solvents are propylene carbonate, acetonitrile, dimethylformamide, dimethylsulfoxide and the like. The cathodic component of the battery comprises the sulfur dioxide (also acts as an electrolytic co-solvent) as the active positive material and carbon electrode which both catalyzes the discharge of sulfur dioxide and carries the electronic current to the current collector.

The cell discharge reaction involves:

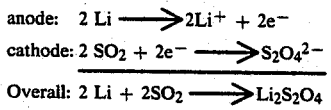

During the discharge of the primary Li/SO$_2$ cell, insoluble lithium dithionate is deposited at the carbon electrode.

The present invention is directed to an improved carbon electrode useful in a Li/SO$_2$ battery. The subject carbon electrode can also be effectively used as a component in a reserve type lithium-liquid depolarizer battery in which the depolarizing liquid is, for example, SO$_2$, SOCl$_2$, SO$_2$Cl$_2$ and the like.

At present, one of the most limiting factors in providing an effective Li/SO$_2$ battery resides in the cathodic carbon electrode. The carbon electrode, although not taking an active part in the redox reaction of the battery, plays an extremely important part in achieving a highly effective battery. The electrode must be highly conductive and, therefore, must be a product having very high percentages of electrically conductive material. In addition, the electrode should have a high capacity to effectively store the battery discharge precipitant, lithium dithionate. The electrode should be highly porous and have substantially uniform porosity throughout, including the electrode's thickness. It is also highly desirable to have the carbon electrode in the form of a free-standing sheet having rheological properties which permit it to be manipulated and processed into various battery configurations such as plates, jelly rolls, accordian shape and the like without causing defects in the carbon sheet. It is desirable to have the carbon electrode produced in a non-aqueous system to prevent corrosion within the electrode (of the current collector) and the system (of the anodic metal). Finally, it is desirable to have a carbon electrode which is capable of being readily formed in a manner which is not labor intensive.

The carbon electrodes presently used in Li/SO$_2$ batteries are constructed from a porous mass of carbon black with a polyfluorocarbon polymer binder. The binder is normally present in from 5 to 20 percent based on the total electrode composition. Normally aqueous slurries of the carbon and binder are prepared and then formed into sheets by calendering or doctoring the slurry into plates. A current collector, such as an expanded aluminum screen is pressed into the sheet, the aqueous solvent then removed by drying the product at elevated temperatures and the binder is then cured. Several drawbacks reside in the polyfluorocarbon - carbon electrode. The product exhibits poor integrity with elements flaking off when in the final dried state. Further, flaking of carbon particles may cause contamination of the equipment and internal shorting of the battery. The presently known electrodes do not exhibit sufficient rheological properties to readily permit winding of the electrode into narrow diameter cells. The porosity and uniformity of the final electrode product are poor due to the required mode of drying which inherently leaves pinholes in the product and causes greater porosity at the electrode surface then in its core providing a pore size distribution which is very large. The larger pores do not provide the needed surface area to volume ratio for proper utilization of the carbon and sufficient capacity for precipitation of the discharge product, lithium dithionate. Further, voltaic corrosion of the aluminum current collector is observed and is attributed to the presence of water during the formation of the electrode.

The polyfluorocarbon bound carbon electrode is hard to fabricate into a thin, uniform sheet product. The process of forming is labor intensive (partially due to the large degree of inspections required) and costly (partially due to the irreproducebility of the product).

It is highly desired and the object of the present invention to produce carbon electrode suitable for use in a Li/SO$_2$ system which has a very high carbon content, has a uniform porosity and a narrow pore size distribution, exhibits a high degree of integrity and stability, has good rheological properties to provide a free standing sheet capable of exhibiting a high degree of flexibility, and which can be readily formed without the aid of water in a labor and cost effective manner.

SUMMARY OF THE INVENTION

A sheet product suitable for use in a Li/SO$_2$ battery, an electrode formed therefrom and an improved Li/-

SO$_2$ battery containing the subject electrode is the subject of the present invention. The sheet comprises a substantially uniform, microporous sheet having a composition of from 78 to 93 volume percent of a high surface area, conductive carbon black, from 7 to 22 volume percent of polyethylene having a weight average molecular weight of greater than 2,000,000 and from 0 to 2 volume percent of a plasticizer for said polyethylene. The sheet has a pore volume greater than 75% and a pore size distribution wherein at least 90 percent of the pore volume is provided by pores having radii within the range of about 10 millimicrons to about 5 microns. The electrical conductivity of the sheet is at least 0.05 ohm$^{-1}$ cm$^{-1}$. The sheet exhibits good rheological properties to provide a product which can be readily shaped and processed into configurations required for battery assembly.

DETAILED DESCRIPTION OF THE INVENTION

The subject invention is directed to a carbonaceous sheet product having a very high content of particulate carbon therein to exhibit conductivity of at least 0.05 ohm$^{-1}$ cm$^{-1}$ and preferably at least 0.2 ohm$^{-1}$ cm$^{-1}$. The sheet is microporous and has a high void volume of suitable design to accommodate the discharge product of a Li/SO$_2$ battery. The sheet must be formed with a very small amount of ultra-high molecular weight polyethylene which is initially mixed with a high temperature plasticizer to provide a mixture capable of being processed into a sheet product.

The carbon cathode of the present invention is produced by initially blending a composition of from 1.5 to 4.5 (preferably 2 to 3.5) volume percent of an ultra-high molecular weight polyethylene, from 8 to 27 (preferably 13 to 22) volume percent of an electrically conductive, high surface area carbon in particulate form and from 70 to 90 (preferably 75 to 85) volume percent of a plasticizer for the polyethylene. The composition is blended to form a substantially uniform composition. This composition, even though being very highly filled with solid, particulate carbon and containing ultra-high molecular weight polyethylene, has been found to be capable of mixing to a uniform composition and being formed, by conventional techniques into a sheet form. The plasticizer contained in the initial sheet is substantially completely removed by extraction with a suitable solvent to provide the desired sheet product of this invention.

The resultant sheet product formed in the above described manner is a microporous sheet product having a composition of from 7 to 22 (preferably 10 to 20) volume percent of the polyethylene and from 78 to 93 (preferably 80 to 90) volume percent of the high surface area particulate carbon material and from 0 to 2 (preferably 0 to 1) volume percent residual plasticizer. The very high carbon loading of this sheet product can be further appreciated when these values are expressed in weight percentages. The sheet contains from 3.5 to 11 weight percent of ultra high molecular weight polyethylene, from 89 to 96.5 weight percent of particulate carbon and from 0 to 1 weight percent plasticizer.

The polyethylene required for forming the present sheet product is an ultra-high molecular weight polymer having a weight average molecular weight of greater than 2,000,000 and preferably greater than 3,000,000. The most preferred polymer has a weight average molecular weight of 5,000,000. These materials are non-elastomeric polymers exhibiting a high degree (at least 40 percent, preferably at least 50 percent) of crystallinity by X-ray analysis. Conventional high molecular weight material, such as polymer of 500,000 or one million molecular weight are unsatisfactory as they do not permit formation of sheet product with the presently required high loading and high initial plasticizer content.

The polymer content of the sheet may contain small (less than 10 and preferably less than 5 volume percent) amount based on the total polymer content of a polyolefin having a molecular weight of 500,000 or greater and preferably greater than 1,000,000. The polyolefin can be selected from polyethylene, polypropylene, polybutadiene, polybutene and the like as well as substituted polyolefins such as halogenated olefinic polymers and the like as well as mixtures and copolymers of the above.

The carbon material required in forming the subject sheet product and the electrode therefrom must be selected from a high conductivity carbon material have a high surface area (BET) of at least 30 m$^2$/g and preferably from 30 to 500 m$^2$/g. The term "high surface area" when used in describing the particulate carbon used herein means a surface area of from 30 to 500 m$^2$/g and preferably from 30 to 90 m$^2$/gm. Very high surface area material (greater than 500 m$^2$/g) should be avoided as they will produce a sheet having low cohesiveness. The particle size of the carbon should be from about 10 to 100 millimicrons (BET) and preferably from 10 to 50 millimicrons. Smaller particle size material may be included when readily available. The conductivity of the carbon material should be at least 20 ohm$^{-1}$ cm$^{-1}$. Examples of suitable carbon materials are high surface area carbon black, graphite and the like such as, for example, carbon black made from acetylene or other natural gasses and oils.

The plasticizer must be present in the initial formulating and processing to form an initial sheet product, as more fully described below. The term "plasticizer" as used herein and in the appended claims refers to compounds which are capable of interacting with the polyethylene, under the operating conditions used to form the sheet product, to impart softening and flexibility to the polymer and the admixture. The plasticizer provides the means of fabricating the composition to a uniform consistency and to aid in inducing and controlling the degree of porosity, the pore size distribution and uniformity of porosity throughout the resultant sheet product. Although the plasticizer used herein to form the initial sheet is used in very large amounts, the composition has been found to provide sufficient strength to achieve a free-standing sheet which upon extraction of the plasticizer produced a product still capable of being free standing and flexible to allow easy processing to a battery component.

Plasticizers suitable for the instant invention are compounds which are capable of plasticizing polyethylene, are substantially inert with respect to the particulate material used herein and are substantially soluble in an organic solvent which is a non-solvent with respect to the polymer component described above and the particulate material described below which are used in forming a particular composition. Representatives of such plasticizers are organic esters, such as sebacates, phthalates, stearates, adipates and citrates; epoxy compounds such as epoxidized vegetable oil; phosphate esters such as tricresyl phosphate; hydrocarbon materials such as petroleum oil including lubricating oils and fuel oils, hydrocarbon resin and asphalt and pure compounds such as eicosane; coumarone-indene resins and terpene resins; tall oil and linseed oil. The preferred plasticizers are selected from petroleum oils. The plasticizer is generally substantially free of water (anhydrous) and, therefore, compatible with the subject battery system.

The organic plasticizer used herein aids in fabricating the sheet product and in imparting microporosity to the resultant sheet. The void volume of the resultant sheet will be directly dependent upon the amount of plasticizer used to form the initial composition and the amount of plasticizer extracted to provide the final sheet product. Void volume of the final sheet product must be greater than 75 volume percent and preferably will range from greater than 75 volume percent to about 85 volume percent with void volumes of greater than 80 percent to 85 percent being most preferred. The sheets void volume is of a microporous character which generally have narrow distribution and are of low mean radius (i.e. 0.02 to 0.15 microns) and can be determined by standard mercury intrusion techniques.

In addition to the above described components, the initially formed admixture may further contain conventional stabilizers, antioxidants, wetting agents, processing aids or mixtures thereof. Representative of stabilizers are 4,4-thiobis(6-terbutyl-m-cresol) sold commercially under the tradename "Santonok" and 2,6-ditert-butyl-4-methylphenol sold commercially under the tradename "Ionol". Examples of known commercially available wetting agents include sodium alkyl benzene sulfonate, sodium lauryl sulfate, dioctyl sodium sulfosuccinate, and isooctyl phenyl polyethoxy ethanal. Processing aids include stearates, graphite and the like.

The above described components can be readily formed into a substantially homogeneous admixture. The initial admixture should be formed by blending from about 1.5 to 4.5 (preferably 2 to 3.5) volume percent polymer, from about 8 to 27 (preferably 13 to 22) volume percent of the electrically conductive carbon and from about 70 to 90 volume percent of a plasticizer material for the polymer. The blending of the components can be readily accomplished by conventional means such as by initially mixing at room temperature in a blender and then in a Banbury, Brabender or sigma blade mixer or the like at moderate (about 25° to about 180° C., preferably from about 130° to about 170° C.) temperatures. The blending and processing can be done under dry conditions to avoid water pick-up by the materials.

It has been unexpectedly found that extremely high particulate content admixtures required by the present invention exhibit rheological properties which permit them to be readily shaped and formed into thin sheet products of less than about 50 mils and preferably less than about 30 mils. Sheet products of the present invention typically exhibit tensile modulus of greater than about 600 psi, tensile stress of at least about 50 psi and elongation before break of greater than 30 percent and most often greater than 50 percent.

It must be understood that the particular thickness can be customized by the artisan based on the battery design and its acceptable drain rate. Sheet products and electrodes therefrom can be made of less than 10 mils and even less than 5 mils thickness. Sheet products made by presently known conventional techniques can not be formed of such thin dimensions and maintain good mechanical properties as is attainable by the sheet products of the present invention. The term "sheet" as used herein and in the appended claims refers to a shaped product having extensive length and breath dimensions and of thin cross-section and which may have major surfaces which are substantially flat or of a predetermined design. The electrode can be formed with ribs or other design on its major surface during formation or alternately the surface may be scored to provide channels and other designs thereon.

The initial sheet product can be readily formed from the admixture by subjecting the admixture to extrusion, calendering, injection molding or compression molding processing. All of these processing means are capable of producing the initial sheet in large volume using low labor involvement. The most preferred method is extrusion of the admixture using a conventional extrusion apparatus to continuously provide initial sheet product.

The initial sheet (a sheet having high levels of plasticizer therein) can be formed at moderate operating conditions, including low temperatures of from about 25° to 180° C. and preferably from about 130° to 170° C. to provide a sheet which is free-standing and has substantial uniform distribution of carbonaceous material throughout its length and breadth dimensions as well as across its cross-sectional dimension. The initially formed sheet can be readily made into a suitable cathodic electrode by laminating a conventional current collector with at least one sheet of the present invention. Electrodes can be formed from two sheets which have a current collector sandwiched between them. When so formed, the resultant electrode is a unitary product having the collector embedded therein. This provides an electrode with less resistance (due to gaps and the like between sheets and between sheets and the collector). In addition, the subject cathode product can be formed as a unitary product which has its exposed major surfaces composed of an inert sheet. This can be readily done by laminating a conventional microporous polyolefin based separator sheet material with the subject carbon cathode. A sheet of conventional separator sheet material of a thickness normally of from 1 to 10 mils. can be placed on each side of the formed cathode (or on each side of the above described sandwich prior to lamination) and subjected to moderate temperature and pressure to provide a unitary product. This unitary cathode product is achievable when formed from the present sheet due to the present sheet's pliable and moldable character. The plasticizer component can be extracted, as described below, prior or subsequent to lamination with the current collector. It is preferred to initially form the laminate structure of at least one sheet with a suitable current collector and then extract the plasticizer material.

The current collector is normally a screen, grid, expanded metal, woven or non-woven fabric or the like formed from metals such as copper, aluminum, nickel, steel, lead, iron or the like. The current collector, when laminated to the final sheet product (a sheet substantially comprising particulate carbon material bonded by very low amounts of polyethylene) of the present invention, provides a low electronic resistance path between the active material and the battery terminal.

The sheet product, with or without the presence of plasticizer, is a pliable and moldable material which can be readily laminated to the collector screen by concurrently passing a screen and at least one sheet through a set of nip rollers or the like to press (under low pressure and preferably at moderate temperatures of about 25° to 170° C.) to produce a laminate product. It is preferred that the laminate be of a configuration of a screen sandwiched between (and thereby embedded in) two sheets although a laminate of a single sheet and single screen may be desired in certain applications. The laminate can be most readily formed by utilizing an initial sheet product immediately after its production to utilize the sheet in its elevated temperature state.

The plasticizer contained in the initial formed sheet should be substantially completely removed by means of extraction using suitable solvent. The resultant sheet will be a microporous carbonaceous sheet product composed of from about 7 to 22 volume percent of the ultra high molecular weight polyethylene and from 78 to 93 volume percent of the high surface area conductive carbon with from 0 to 2 volume percent of residual plasticizer. The sheet has a very high void volume of greater than 75 (preferably greater than 80) volume percent and a narrow pore size distribution with at least 90 percent of the pore volume provided by pores having radii of from about 10 millimicrons to about 5 microns and an average pore radius of from about 0.02 to 0.15 microns.

The procedure for extraction of the plasticizer from a sheet product is well known and is not meant to form a part of the present invention, per se. A single stage extraction can be used. The solvent or extraction conditions should be chosen so that the polyolefin and carbonaceous material are essentially insoluble. For example, when petroleum oil is to be extracted from the formed sheet, the following solvents are suitable; chlorinated hydrocarbons such as trichloroethylene, tetrachloroethylene, carbon tetrachloride, methylene chloride, tetrachloroethane, etc., as well as hydrocarbon solvents such as hexane, benzene, petroleum ether, toluene, cyclohexane, gasoline, etc. Aqueous solutions as well as solvents which are reactive with sulfur dioxide should be avoided.

The extraction temperature can range anywhere from room temperature up to the melting point of the polyolefin as long as the polyolefin does not dissolve. The time of the extraction will vary depending upon the temperature used and the nature of the plasticizer being extracted. For example, when a higher temperature is used, the extraction time for an oil of low viscosity can be a very short time of up to only a few minutes, whereas if the extraction is performed at room temperature, the time requirement will be greater.

The electrical conductivity of resultant sheet (without current collector) formed according to the present invention were measured with a Yellow Spring Instrument Conductivity Bridge at 1 KHz placing a nickel metal clamp on each of the two opposite ends of the specimen to be tested in such a manner as to have a free sample spacing of 1 cm by 1 cm not covered by the clamps. The thickness of the samples were measured. The clamps were connected to the bridge and the resistance of the samples were measured. To check the accuracy of the measurements, the clamps were adjusted to a spacing of 2 cm by 1 cm and the resistance remeasured. The conductivity of the sheet product must be at least 0.05 ohm$^{-1}$ cm$^{-1}$ and preferably at least 0.2 ohm$^{-1}$ cm$^{-1}$.

The porosity volume percent or void volume percent were calculated for the resultant sheet product by immersing a sample of product in water and calculating the wet weight minus dry weight divided by the sheet product's geometric wet volume. Pore size distribution was determined by conventional technique using a Micrometrics Auto-pore 9200 mercury porosimeter.

Rheological properties were measured using an Instron tensile testing apparatus. The samples were tested at an elongation rate of 1 in/min. in accordance with ASTM D 638.

Discharge tests were performed on cells having the subject sheet using a Princeton Applied Research Model 363 galvanostat. The galvanostat was powered and monitored with an Analog Devices μMAC 5000 microcomputer which controlled the current passing through the cell and measured the current passing through the cell and measured the current voltage and charge throughout the cycle. In other tests, cells were discharged across a constant load, the charge passing through the cell was measured with a PAR (Princeton Applied Research) coulometer with the current and voltage being recorded on strip chart recorders.

The following examples are given for illustrative purposes only and are not meant to be a limitation on the subject invention, except as made in the claims appended hereto. All parts and percentages are by weight unless otherwise indicated.

EXAMPLE I 1.4 parts of polyethylene having a weight average molecular weight of about 5,000,000 was mixed with 18 parts of Shawinigan processed conductive carbon black (acetylene black, 50 percent compressed density of 2.1 gm/cc; 70 m$^2$/gm BET surface area) and 42 parts of hydrocarbon oil (Sunthene 255; density of 0.89 gm/ml, 54 SSU at 210° F., flash point of 390° F.). The initial mixture was placed into a Brabender blender and compounded at 50 RPM and 160° C. for a period of about 5 minutes. The mixture was removed from the blender, broken into small pieces and returned to the blender for compounding for an additional 5 minutes at 160° C. The resultant substantilly uniform mixture was again removed from the blender and cooled in air.

The mixture was pressed into sheets of 20 mil thickness using a Walash press maintained at 160° C. and 500 psi. The sheet was immersed in cyclohexane for 3 periods of 10 minutes each and then dried. The conductivity of the sheet was measured as 0.2 ohm$^{-1}$ cm$^{-1}$.

EXAMPLE II

Two sheets formed according to Example I above (prior to extraction) were used to form a cathode by placing one sheet on each side of an expanded aluminum metal screen. The composite was subjected to 250 psi pressure at 150° C. for about 10 seconds to produce a unitary product having the screen embedded therein.

The carbon cathode was immersed in cyclohexene for 3 periods of 10 minutes each to yield a microporous sheet of 37 mil thickness. The void volume of the product was 82 percent and the average pore size was about 0.2 micron. The product exhibited flexibility and cohesiveness and could be spirally wound. The product was suitable for use as a carbon electrode in a Li/SO$_2$ cell.

EXAMPLE III 1.4 parts of polyethylene having a weight average molecular weight of about 5,000,000 was mixed with 19 parts of conductive black furance carbon (Vulcan XC 72, BET surface area 240 m$^2$/g) and 42 parts of hydrocarbon oil (Sunthene 255). The mixture was processed in the same manner as described in Example 1 above and was then extracted with cyclohexane for 3 periods of about 10 minutes each. The porosity of the sheet was measured as 77 percent and the conductivity was 1.47 ohm$^{-1}$ cm$^{-1}$.

EXAMPLE IV

A sheet product was formed in the same manner as described in Example I above except that 3.5 parts of the carbon black was replaced with a commercial (Ketjen) carbon black having a BET surface area of 1000 m$^2$/g to give the total carbon black component an average BET surface area of about 250 m$^2$/g.

The resultant sheet had a porosity of 82 percent and the conductivity was measured as 0.62 ohm$^{-1}$ cm$^{-1}$.

EXAMPLE V

A carbon electrode was prepared in the same manner as described in Example II above except that prior to extraction the surface of the sheet was scored with parallel lines using stainless steel blades. The resultant electrode was spirally wound with Li foil into a jelly roll configuration. The roll was placed into a stainless steel container having the size of a conventional D cell battery. A premixed electrolyte composition comprising 10 parts LiBr, 27 parts acetonitrile and 63 parts SO$_2$ was vacuum filled into the cell and the cell was then hermetically sealed. The cell was discharged through 1.3 ohm load to give an average current of 2.0 amperes at an average operating voltage of 2.6 volts. The lithium utilization efficiency to a 2.0 volt cutoff was 82 percent. The discharge curve was very flat, a characteristic associated with an effective carbon electrode.

EXAMPLE VI

Several sheets were prepared according to the procedure described in Example I above. The same carbon and oil components used in Example I were used herein to form the sheets. Polyethylenes of different molecular weights and differing amounts of materials were used as indicated in the table below. The formed sheet was extracted for 3 ten minute periods using cyclohexane to product sheets with void volume of 78±1 percent. The resultant sheets were all flexible, self-standing materials having the following rheological properties:

| Example | Polymer MW | Polymer wt. % | Carbon wt. % | Oil wt. % | Tensile Modulus PSI | Tensile Stress PSI | Elongation @ Failure % |
|---|---|---|---|---|---|---|---|
| A | 3,000,000 | 2.3 | 28.2 | 69.5 | 975 | 90 | 69.2 |
| B | 5,000,000 | 2.3 | 28.2 | 69.5 | 1230 | 93.3 | 99.5 |
| C | 5,000,000 | 2.7 | 26.8 | 70.5 | 1410 | 132 | 190 |

We claim:

1. A carbon electrode suitable for use in a Li/SO$_2$ battery comprising at least one substantially homogeneous, microporous sheet having a composition of from about 7 to 22 volume percent of high density polyethylene having a weight average molecular weight of at least about 3,000,000, from 78 to 93 volume percent of a high surface area, conductive carbon having a surface area of from 30 to 500 m$^2$/gm, a mean particle size of from 10 to 100 millimicrons and conductivity of at least 20 ohm$^{-1}$ cm$^{-1}$ and from 0 to 2 volume percent of a plasticizer for said polyethylene; and a current collector composed of a conductive material, said current collector being in intimate contact with each of said at least one sheet.

2. The electrode of claim 1 wherein the composition comprises from 10 to 20 volume percent polyethylene, from 80 to 90 volume percent particulate carbon and from 0 to 1 volume percent plasticizer.

3. The electrode of claim 2 wherein the polyethylene present in said sheet product has a weight average molecular weight of greater than 3,000,000.

4. The electrode of claim 2 wherein the current collector is in the form of a screen, grid, expanded metal, foil or woven or non-woven fabric formed of a conductive metal, each major surface of the electrode comprises substantially nonconductive microporous polyolefin and said electrode is a substantially unitary sheet having the current collector embedded therein.

5. The electrode of claim 2 wherein the pores of said sheet have an average pore size of less than 0.2 microns and a pore size distribution wherein at least 90 percent of the pore volume is provided by pores having radii of from about 10 millimicrons to about 5 microns.

6. The electrode of claim 5 wherein the polyethylene present in said sheet product has a weight average molecular weight of greater than 3,000,000.

7. The electrode of claim 5 wherein the current collector is in the form of a screen, grid, expanded metal, foil or woven or non-woven fabric formed of a conductive metal, each major surface of the electrode comprises substantially nonconductive microporous polyolefin and said electrode is a substantially unitary sheet having the current collector embedded therein.

8. The electrode of claim 1 wherein the pores of said sheet have an average pore size of less than 0.2 microns and a pore size distribution wherein at least 90 percent of the pore volume is provided by pores having radii of from about 10 millimicrons to about 5 microns.

9. The electrode of claim 8 wherein the polyethylene present in said sheet product has a weight average molecular weight of greater than 3,000,000.

10. The electrode of claim 8 wherein the current collector is in the form of a screen, grid, expanded metal, foil or woven or non-woven fabric formed of a conductive metal, each major surface of the electrode comprises substantially nonconductive microporous polyolefin and said electrode is a substantially unitary sheet having the current collector embedded therein.

11. The electrode of claim 1 wherein the polyethylene present in said sheet product has a weight average molecular weight of greater than 3,000,000.

12. The electrode of claim 11 wherein the current collector is in the form of a screen, grid, expanded metal, foil or woven or non-woven fabric formed of a conductive metal, each major surface of the electrode comprises substantially nonconductive microporous polyolefin and said electrode is a substantially unitary sheet having the current collector embedded therein.

13. The electrode of claim 1 wherein the current collector is in the form of a screen, grid, expanded metal, foil or woven or non-woven fabric formed of a conductive metal, each major surface of the electrode comprises substantially nonconductive microporous polyolefin and said electrode is a substantially unitary sheet having the current collector embedded therein.

14. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 1.

15. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 2.

16. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 3.

17. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 4.

18. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 5.

19. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 6.

20. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 7.

21. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 8.

22. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 9.

23. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 10.

24. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 11.

25. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 12.

26. In a Li/SO$_2$ battery comprising at least one lithium metal anode, at least one carbon cathode and an electrolytic solution composed of a salt, organic cosolvent and sulfur dioxide as an electrolytic cosolvent and active positive material, wherein the improvement comprises that the at least one carbon cathode consists essentially of the product of claim 13.

* * * * *